United States Patent [19]

Betts

[11] Patent Number: 5,071,088

[45] Date of Patent: Dec. 10, 1991

[54] HIGH LIFT AIRCRAFT

[75] Inventor: Edward E. Betts, Escondido, Calif.

[73] Assignee: The United States of America as represented by the Secretary of the Navy, Washington, D.C.

[21] Appl. No.: 453,658

[22] Filed: Nov. 29, 1989

[51] Int. Cl.$^5$ .................. B64C 15/00; B64C 39/04
[52] U.S. Cl. ............................. 244/12.1; 244/12.5; 244/45 R; 244/55; 244/198
[58] Field of Search ............. 244/12.5, 207, 36, 45 R, 244/45 A, 55, 87, 88, 75 R, 12.4, 15, 130, 12.1, 15, 75 R, 130, 207, 198

[56] References Cited

U.S. PATENT DOCUMENTS

| | | | |
|---|---|---|---|
| 2,712,421 | 7/1955 | Naumann | 244/49 |
| 2,957,647 | 10/1960 | Shew | 244/45 R |
| 3,018,987 | 1/1962 | Multhopp | 244/75 R |
| 3,026,065 | 3/1962 | Holland, Jr. | 244/12.4 |
| 3,159,361 | 12/1964 | Weiland | 244/12 |
| 3,614,028 | 10/1971 | Kleckner | 244/54 X |
| 3,856,238 | 12/1974 | Malvestuto, Jr. | 244/55 X |
| 3,874,620 | 4/1975 | Kahler et al. | 244/110 B |
| 3,884,432 | 5/1975 | Blanchard, Jr. et al. | 244/55 X |
| 4,165,058 | 8/1979 | Whitener | 244/45 R |
| 4,390,150 | 6/1983 | Whitener | 244/45 R |
| 4,392,621 | 7/1983 | Viets | 244/12.5 |
| 4,478,378 | 10/1984 | Capuani | 244/12.5 |
| 4,542,866 | 9/1985 | Caldwell et al. | 244/45 A |
| 4,575,030 | 3/1986 | Gratzer | 244/214 X |
| 4,598,888 | 7/1986 | Beteille | 244/76 R |
| 4,641,800 | 2/1987 | Rutan | 244/218 |
| 4,674,716 | 6/1987 | Moore | 244/207 |

FOREIGN PATENT DOCUMENTS 0322775 7/1989 European Pat. Off. ............. 244/87
470650 3/1937 United Kingdom .

OTHER PUBLICATIONS

Jane's All the World's Aircraft "Custer", 1965–1966, pp. 212, 234.
Attinello, John S., Design and Engineering Features of Flap Blowing Installations, pp. 463–515, 1961.
Vogler, Raymond D., Wind-Tunnel Investigation of a Four-Engine Externally Blowing Jet-Flap Stol Airplane Model, Dec. 1970, pp. 1–16.
Johnson, Joseph L., Jr. & Phelps, Arthur E., III, Low-Speed Aerodynamics of the Upper-Surface Blown Jet Flap, pp. 1786–1796, Apr.–May 1974.

(List continued on next page.)

Primary Examiner—Joseph F. Peters, Jr.
Assistant Examiner—Carla Mattix
Attorney, Agent, or Firm—Harvey Fendelman; Thomas Glenn Keough; Peter A. Lipovsky

[57] ABSTRACT

A high lift vertical takeoff and landing aircraft has first and second fuselages connected by a central airfoil. Jet engines at the leading edge of the airfoil expel propulsive streams simultaneously over top and bottom surfaces of the foil. Extendable flaps are utilized at a trailing edge of the airfoil with a horizontal control blade being attached to the leading edge of the foil. The control blade is within the jet's propulsive stream to permit proportioning of the stream above and below the airfoil.

An extendable augmenter wing is attached between the fuselages aft and above the main airfoil to permit airflow in this region to be directed downwardly, accelerating the flow and providing additional lift.

The main airfoil is positioned so that the fuselage walls extend above and below the foil. Lateral flow of the main engine exhaust is restrained by these walls. Above the wing the walls and airfoil create a venturi to speed airflow and decrease pressure. Below the wing the walls and extended flaps dam exhaust and ambient flow to create a high pressure region. Outboard wings provide seconary lift and reduce main wing loading.

A canard is attached between the fuselages to provide pitch control. Both top and bottom canard surfaces are blown by forward mounted engines or exhaust ducts to add lift to the aircraft and to permit upward tilting of the aircraft during takeoff and landing. Tilting the aircraft permits the resultant of the engine thrust and wing lift vectors to be vertical.

27 Claims, 9 Drawing Sheets

OTHER PUBLICATIONS

Campbell, James F., Augmentation of Vortex Lift by Spanwise Blowing, Aug. 4–7, 1975, Los Angeles, Calif.

Harris, K. D., The Hunting H.126 Jet-Flap Research Aircraft, Apr. 20–24, 1970, Rhode-Saint-Genese, Belgium, pp. 14-1–14-7.

Powered-Lift Aerodynamics and Acoustics, May 24–26, 1976, (various excerpts), pp. 12–14, 16–20, 26–27, Hampton, Va.

Sleeman, William C., Jr. et al., Powered-Lift Aerodynamics and Acoustics: "Upper-Surface-Blowing Flow-Turning Performance", May 24–26, 1976, Hampton, Va., pp. 29–43.

FIG. 12

SECTION A-A
FIG. 14

SECTION A-A

SECTION A-A
FIG. 28

FIG. 29

SECTION A—A
FIG. 31

FIG. 30

HIGH LIFT AIRCRAFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to air travel. More particularly, the invention pertains to an aircraft designed to take off and land vertically.

2. Description of the Prior Art

It has been proven that air travel is significantly safer than travel over land by motor vehicle. Safety in air flight is not absolute however as a variety of conditions and circumstances affect this mode of transportation. Some factors that contribute to unsafe flight are high speed runs on takeoff, high speed approaches on landing, cross winds during landing or takeoff, wing icing and landings of one and one-half g's or more. While these are not the only factors that contribute to unsafe flight, their elimination would significantly decrease the likelihood of aviation mishaps.

Short takeoff and landing (STOL) aircraft and vertical takeoff and landing (VTOL) aircraft have been proposed to substantially lessen the above-described hazards. A number of these aircraft have been reduced to practice with a high degree of success. For example, helicopters have been able to overcome many of the safety related problems confronting more conventional aircraft. But even the most advanced helicopters are relatively slow. Hybrid aircraft such as the V-22 Osprey, incorporating rotatable engines, have been relatively successful for their purposes but these too are slower than most conventional aircraft. The success of the British designed Hawker Harrier is well known, however fuel consumption during takeoff and landing is high as lift is accomplished by directing engine thrust vertically during these maneuvers.

For these or other aircraft, taking off and landing vertically requires sufficient lift to be developed to overcome the weight of the aircraft. Beside the traditional airfoil, a number of schemes have been set forth to enhance the lift of aircraft.

Upper surface wing blowing is known to improve the lift effect. In this technique high velocity jet engine exhaust gases are expelled over the upper surface of an airfoil. The low pressure region created by the rapidly moving gases adds significantly to the lift of the blown wing. This upper surface blowing may be used in conjunction with extendable trailing edge flaps to direct downwardly the exhaust gases to further increase lift.

The use of an augmenter wing as a lift enhancement device has been the subject of extensive research. In blown wing or other aircraft the augmenter wing would be disposed aft and above the aircraft's main wing to utilize otherwise "lost" airflow.

An additional lift increasing concept was developed by W. R. Custer and has become known as the Custer channel wing. The channel wing creates a venturi effect in which airflow is increased and pressure is dropped. This effect also induces airflow over the outer wing panel roots to increase aircraft lift and stability. To further take advantage of this moving air, the ailerons could be moved toward the wing roots to increase roll control at takeoff and landing.

These lift enhancement techniques are known to have been utilized independently, however a vertical takeoff and landing aircraft capable of high speeds and efficient fuel consumption would most likely require a combination of techniques such as these.

SUMMARY OF THE INVENTION

The invention takes the features of the prior art and incorporates them in various forms and combinations into a single aircraft. In a preferred embodiment of the invention the aircraft includes first and second fuselages that are aligned and connected by a central airfoil. Attached to a leading edge of the airfoil is at least one jet engine but preferably a plurality of jet engines that are positioned to expel propulsive streams simultaneously over both top and bottom surfaces of the airfoil. Extendable flaps are utilized at a trailing edge of the airfoil to selectively direct the propulsive streams downwardly. A horizontal control blade is disposed within each of the engines' propulsive streams and is pivotally attached to the leading edge of the airfoil to permit a pilot to proportion the flow of the streams above and below the foil.

An augmenter wing is attached between the fuselages aft and above the central airfoil and is extended to extract otherwise lost energy from air moving near the central airfoil's trailing edge. The augmenter wing can be used to direct this airflow downwardly, accelerating the air and providing additional lift.

To impede lateral spanwise flow of the jet engine's exhaust, the central airfoil is positioned so that fuselage walls extend above and below the airfoil. Above the wing, the walls and airfoil create a venturi effect to speed airflow and increase lift. Beneath the wing the fuselage walls act as endplates so that when the trailing edge flaps are extended, ambient and blown air "stacks up" or is dammed under the wing to create a high pressure zone.

In a preferred embodiment of the invention, the aircraft is designed with a center of gravity ahead of a center of pressure of the main wing. The use of a traditional tail with this embodiment would require a downward pull on the tail to counteract the pitch down moment of the aircraft. In a vertical takeoff and landing vehicle, this downward pull would have to be negated by other lifting surfaces. To offset this negative effect, canard surfaces are attached to the fuselages to control the pitching moment of the aircraft. Both upper and lower canard surfaces are blown by at least one jet engine mounted upon the leading edge of the canard or are blown by way of one or more channels routed from the one or several main airfoil engines to the canard surfaces.

During takeoff or landing the fixed and controllable canard surfaces are blown to lift the forward end of the aircraft to an angle at which the vertical components of the engine thrust vector and wing lift vector coincide to provide the lift for vertical takeoff. During this maneuver the main airfoil's trailing edge flaps are fully extended as is the extendable augmenter wing. Each main engine's control blade is angled downwardly to proportion a majority of its propulsive stream to flow over the top surface of the airfoil. Yaw control is provided by vertical vanes, located at a tailpipe of the one or several forward canard engines or ducts, that usurp normal rudder control during takeoff and landing.

OBJECTS OF THE INVENTION

It is an object of the invention to provide improved safety in air travel.

Another object of the invention is to provide an aircraft capable of relatively high lift.

Yet another object of the invention is to provide an aircraft capable of vertical and near vertical takeoff and landing.

Another object of the invention is to provide a vertical takeoff and landing aircraft capable of relatively fast speeds and relatively efficient fuel consumption.

Other objects, advantages and new features of the invention will become apparent from the following detailed description of the invention when considered in conjunction with the accompanied drawings.

DESCRIPTION OF THE PREFERRED EMBODIMENTS

Figure 1:
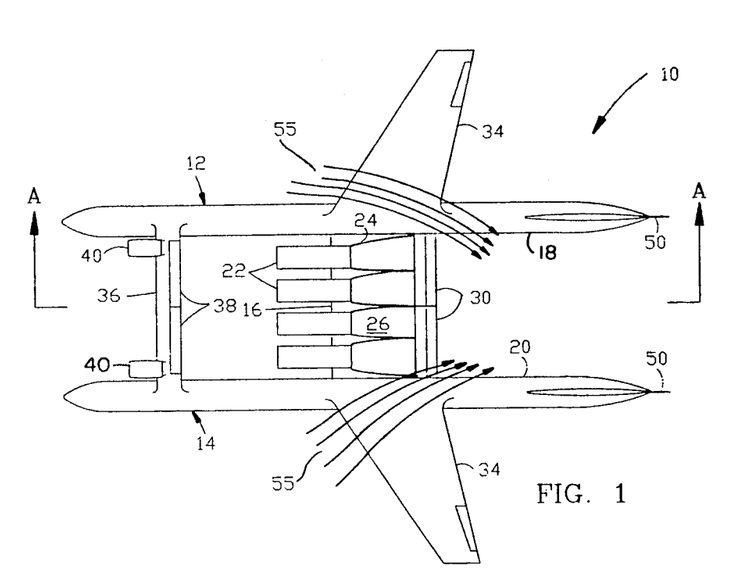
FIG. 1 is a top view of an airliner/transport embodiment of the invention shown with an inboard connecting canard.
Figure 2:
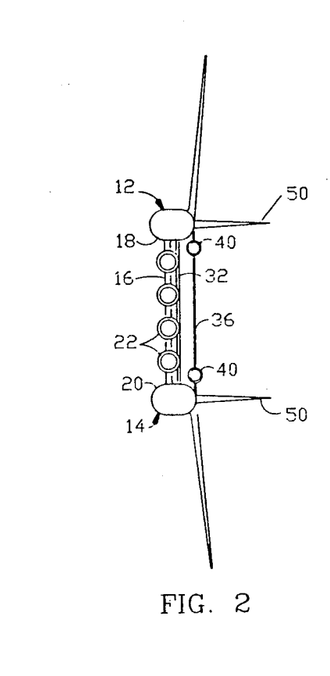
FIG. 2 is a front view of the embodiment shown in FIG. 1.
Figure 3:
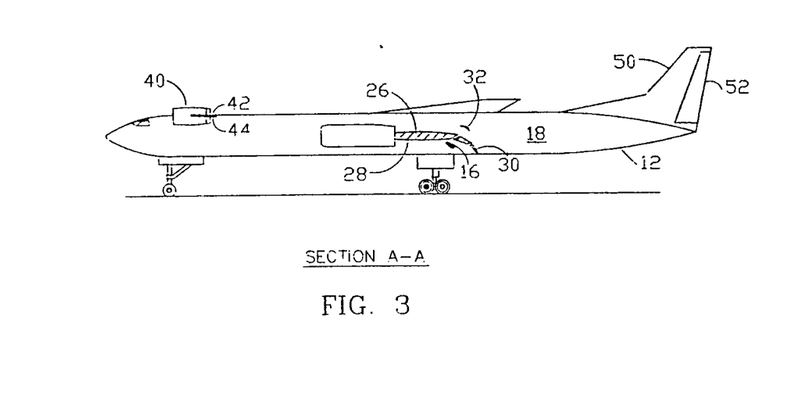
FIG. 3 is a side-section view taken along the section lines of FIG. 1.

Referring to FIGS. 1–3 there is shown an airliner/transport embodiment 10 of the invention incorporating dual fuselages 12 and 14. Fuselages 12 and 14 are joined by main airfoil 16 that is positioned between the fuselages so that inboard wall 18 of fuselage 12 and inboard wall 20 of fuselage 14 extend above and below the airfoil, as is best shown in FIG. 2. Aircraft 10 includes at least one but preferably a plurality of jet engines 22 mounted to the leading edge of airfoil 16 so that propulsive streams 24 are expelled simultaneously over both a top surface 26 and a bottom surface 28 of airfoil 16. Attached to airfoil 16 are extendable and retractable flaps 30 such as those of the slotted Fowler type. Attached aft and above airfoil 16 is an extendable augmenter wing 32, removed from FIG. 1 for clarity but shown in FIGS. 2 and 3. Augmenter wing 32 is spaced aerodynamically from airfoil 16 to extract energy from the decelerating air flow flowing near the trailing edge of airfoil 16.

Aircraft 10 includes secondary wings 34 located outboard of fuselages 12 and 14. The secondary wings provide a secondary lift system for the aircraft and reduce the loading of airfoil 16 during horizontal flight. Pitch control of aircraft 10 is provided by canard 36. Canard 36 and differential controls flaps 38 attached to canard 36 are "blown" by at least one but preferably a plurality of forward jet engines 40 attached to a leading edge of the canard. The engines expel propulsive streams over both a top surface 42 and a bottom surface 44 of the canard, these surface being shown best in FIG. 3. Yaw control is provided by vertical rudders 46, mounted to tail pipe 48 of forward engines 40, shown in detail in FIG. 15, as well as by rear vertical stabilizers 50 with accompanying rudders 52.

Referring now to FIGS. 4 through 11, sectional views of the aircraft of FIG. 1 are shown to depict a takeoff sequence for aircraft 10. The landing sequence is essentially the same but reversed.

Figures 4, 6:
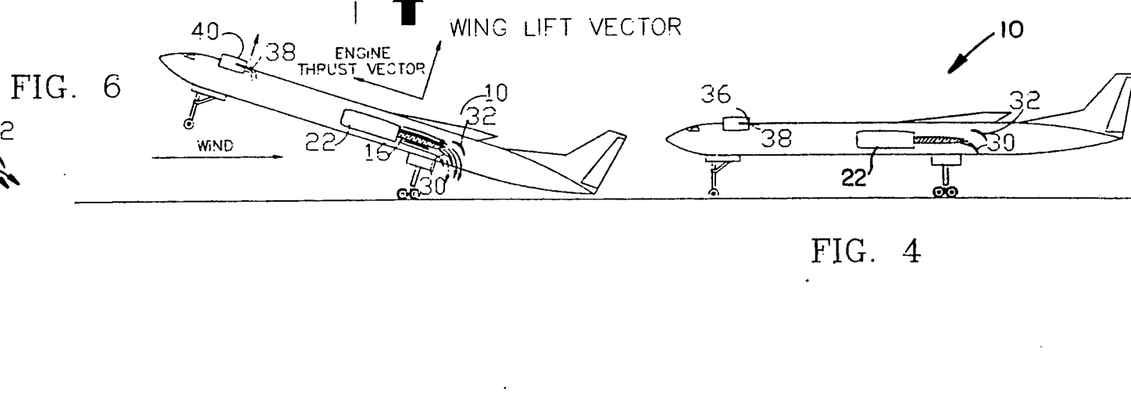
FIGS. 4, 6, 8 and 10 are sectional views of the aircraft of FIG. 1 showing a progression of take-off maneuvers with FIGS. 5, 7, 9 and 11 revealing details of control surfaces during these maneuvers.
Figures 5, 8, 9, 10, 11:
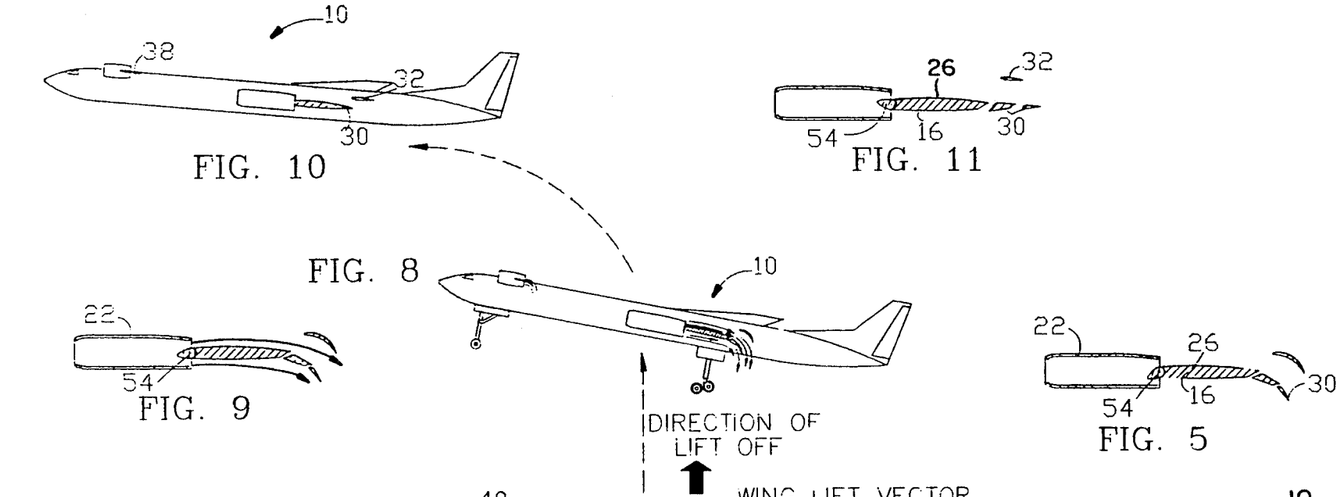

In FIG. 4, taxiing mode for takeoff includes zero degrees tilt of differential control surfaces 38 of canard 36, maximum extension of flaps 30 and maximum extension of augmenter wing 32. As shown in FIG. 5 a horizontal control blade 54 is pivotally attached to the leading edge of foil 16 within the exhaust region of a corresponding engine 22. In takeoff mode, blade 54 is extended downwardly to direct a majority of the propulsive stream from the engine over top surface 26 of airfoil 16 and over extended flaps 30.

Figure 7:
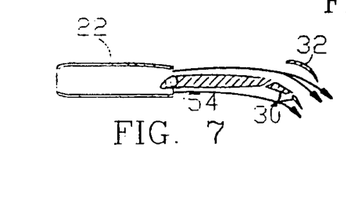

Though the presence of wind is not considered necessary for the takeoff of aircraft 10, in cases in which a wind is present aircraft 10 is pointed into the wind. Referring to FIG. 6, power is increased to canard engines 40 with the exhaust therefrom being blown above and below downwardly tilted canard control surfaces 38. Surfaces 38 direct the thrust of these engines down to raise the nose of the aircraft up. Power is increased in airfoil engines 22 until the combination of wing lift vector and engine thrust vector lifts the plane vertically. The high velocity propulsive streams expelled from engines 22 are directed mostly over the upper surface of airfoil 16 by the control blades 54, one of which is shown in FIG. 7. As the stream travels over the upper surface of wing 16, a low pressure region is created. The exhaust stream is drawn downwardly over fully extended flaps 30 by the Coanda effect. This downward directing of the stream assists in rotating the thrust vector of the aircraft upwardly.

As the exhaust streams travel towards the trailing edge of airfoil 16, they lose velocity resulting in a proportional loss of lift. To continue to extract energy from this slower moving air, fully extended augmenter surface 32 is used to further direct the stream downwardly just aft of wing 16. This change in direction of the streams accelerates the streams to provide additional lift.

Referring to FIGS. 8 and 9 the nose of aircraft 10 is gradually lowered increasing lift and air speed of the aircraft. At this stage, control blades 54 are gradually raised within engines 22.

In FIGS. 10 and 11, differential canard elevators 38, flaps 30 and augmenter 32 are gradually retracted as conventional horizontal flight begins. Control blades 54, one of which is shown in FIG. 11, are slightly raised during horizontal flight to decrease flow over top surface 26 of airfoil 16 to lessen the lift during this cruising mode. In this mode airflow, over outer panels 34 of FIG. 1 increases, providing increased lift.

Referring again to FIGS. 1 through 3 the mechanics of "channeling" air between the dual fuselages of the invention can be more readily understood. It should be noted that a shortcoming of prior art upper surface blowing techniques has been a lack of control of the lateral flow of exhaust gases over a blown wing. In the invention the walls of fuselages 12 and 14 restrain this flow and channel it over wing 16. This channeling of exhaust stream 24 over wing 16 creates a venturi effect accelerating these gases further to thereby lower pressure over the wing. The venturi effect also serves to entrain slower moving higher pressure ambient air 55 over secondary wings 34 and upper surfaces of fuselages 12 and 14 to further increase lift.

Referring again to FIGS. 1-3 with particular attention to FIG. 3, the exhaust stream "blown" over lower surface 28 of wing 16 is likewise impeded from longitudinal flow by fuselage walls 18 and 20. During the course of liftoff or landing the extended flaps 30 impede lateral flow of the propulsive stream so that the combined effects of the extended flaps and fuselage walls creates a "stacking" of ambient air and exhaust beneath the wing. This stacking creates a high pressure zone beneath wing 16 to further aid the lift of the aircraft.

Figure 12:
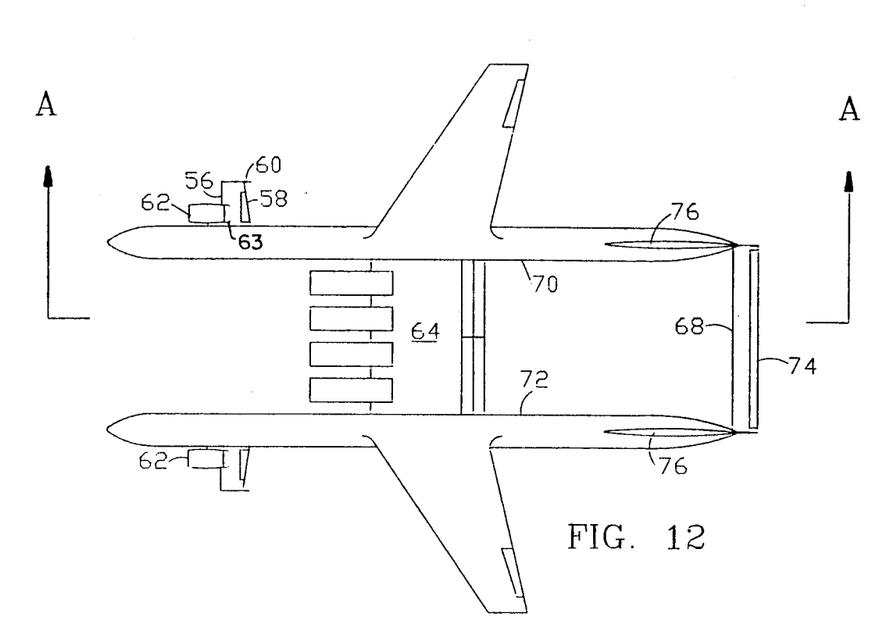
FIGS. 12–14 show top, front and side-section views, respectively, of an embodiment of the invention like that shown in FIG. 1 but incorporating outboard canards.
Figure 13:
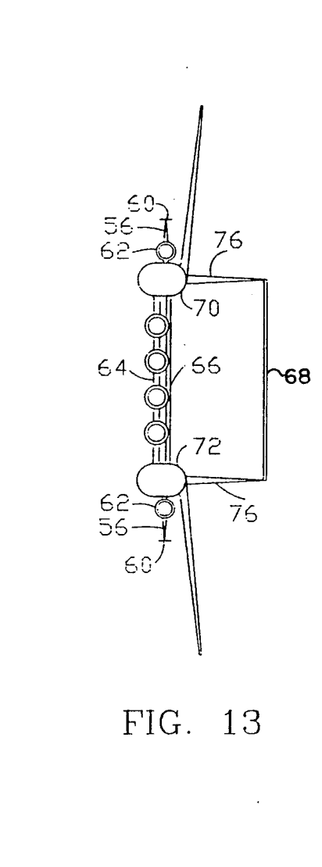
Figure 14:
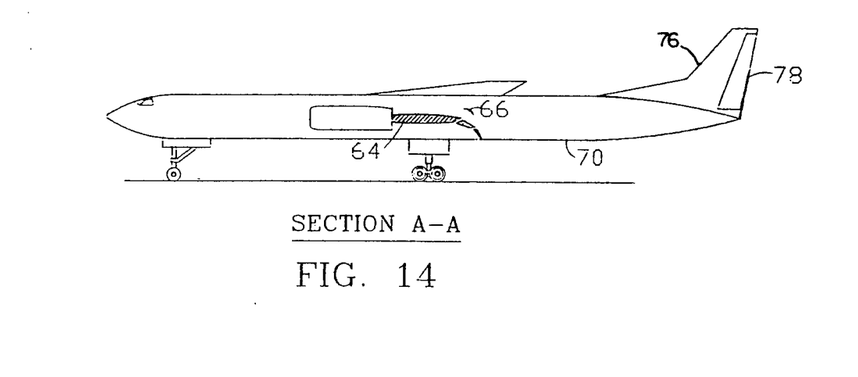

In FIGS. 12 through 14 an alternative embodiment of the aircraft shown in FIG. 1 is illustrated. In this alternative embodiment outboard canards 56 with elevators 58 and endplates 60 are used with upper and lower surface blowing engines 62. Engines 62 have vertical rudders 63 like those illustrated in FIG. 15 to permit yaw control of the aircraft. As can best be seen in FIG. 13, outboard canards 56 provide an unobstructed aerodynamic path for main airfoil 64 and augmenter wing 66.

In this embodiment, additional pitch control is provided by horizontal rear stabilizer 68 attached between dual fuselages 70 and 72. Horizontal stabilizer 68 has a control surface in the form of elevator 74. Stabilizer 68 is mounted to and between vertical stabilizers 76 individual to the fuselages, each stabilizer 76 having a rudder 78.

Figure 16:
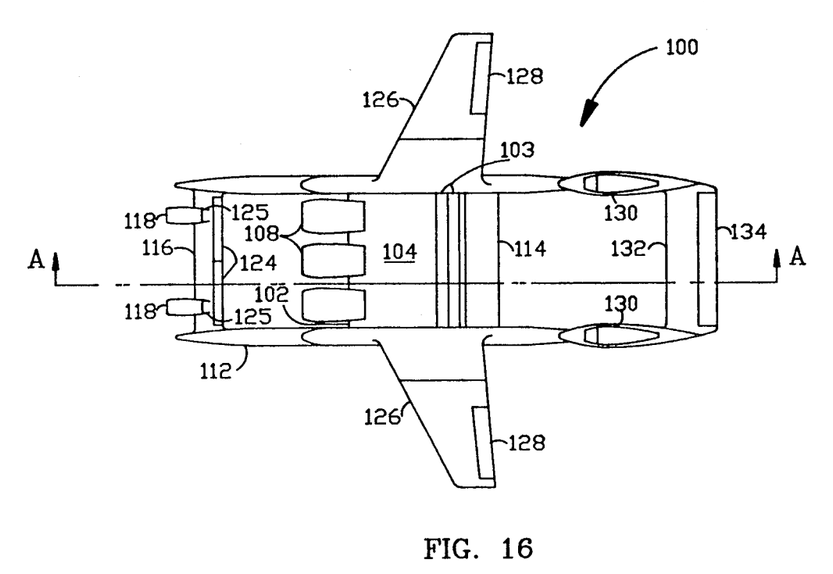
FIGS. 16–18 show a two flight station version of the invention in top, front and side-section views, respectively.
Figure 17:
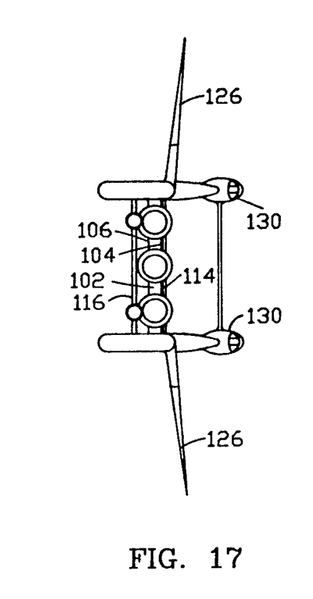
Figure 18:
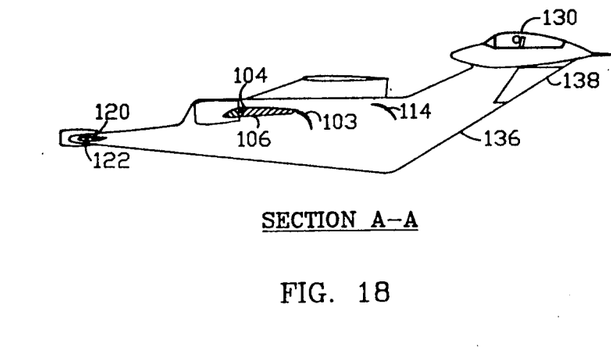

Referring now to FIGS. 16-18, a two flight station aircraft 100 embodying the concept of the invention is shown. Like the aircraft of FIGS. 1 and 12, aircraft 100 includes a main airfoil or wing 102 whose top surface 104 and bottom surface 106 are "blown" by at least one but preferably a plurality of forward mounted engines 108. Like the aforementioned embodiments of the invention, main airfoil 102 of aircraft 100 is mounted between fuselages 110 and 112 so that the propulsive stream of engines 108 are channeled between the fuselages. Mounted aft and above airfoil 102 between fuselages 110 and 112 is an extendable and retractable augmenter surface 114.

Figure 15:
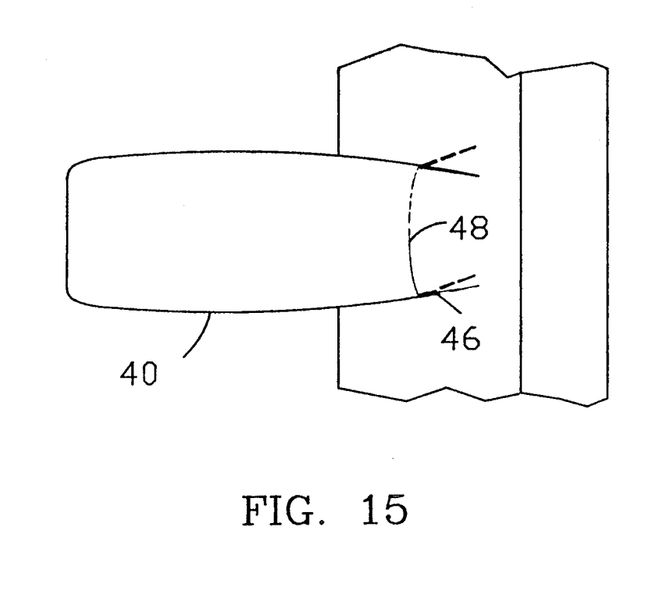
FIG. 15 is a detail view showing vertical control rudders as may be utilized with the canard surfaces of the invention.

A forward canard 116 is mounted between fuselages 110 and 112 and is vertically spaced from main airfoil 102 and augmenter surface 114, the vertical spacing of these surfaces are shown best in FIG. 17. Like the previously disclosed embodiments of the invention, canard 116 has at least one but preferably a plurality of forward engines 118 mounted to a leading edge of the canard. These engines are mounted so that both a top surface 120 and a bottom surface 122 of canard 116 may be simultaneously blown. Differential control surfaces 124 attached to canard 116 are used to aid roll control. For yaw control vertical rudders 125 such as those illustrating FIG. 15 are attached to engines 118 above and below canard surface 116 to direct the propulsive stream from these engines.

Aircraft 100 includes outer wing panels 126 with individual ailerons 128 for control. The outer panels serve as secondary lift surfaces and reduce the loading on main airfoil 102 during flight. Aircraft 10 also includes dual flight stations 130 between which is mounted a horizontal rear stabilizer 132 with control elevator 134. As can best be seen in FIG. 18, flight stations 130 are mounted upon rear vertical stabilizer sections 136 each having control rudders 138.

Figure 19:
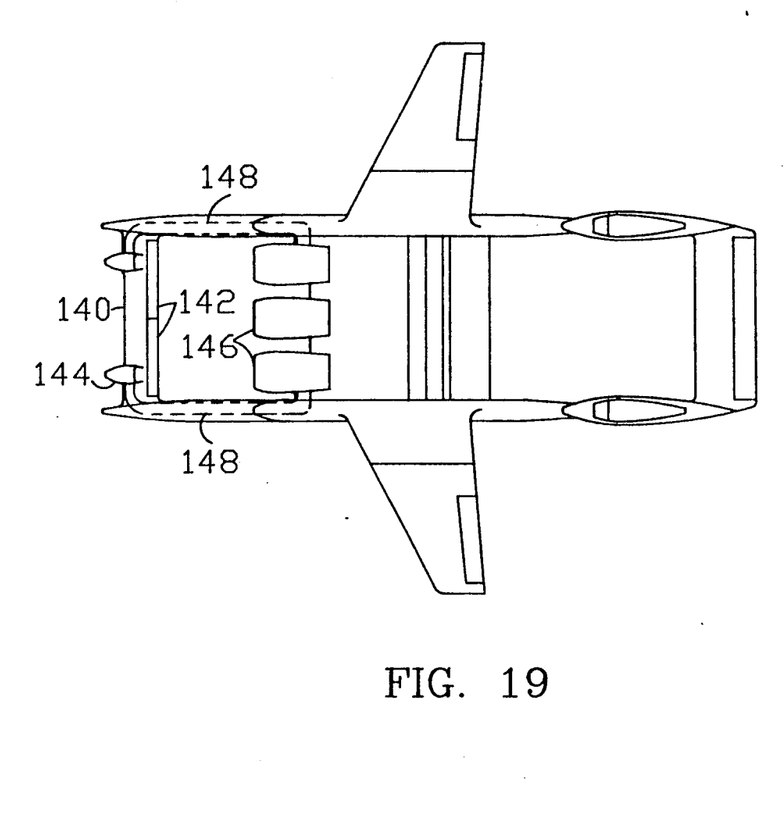
FIG. 19 discloses an embodiment of the invention in which canard surfaces are blown by way of channels routed from main airfoil engines.

In FIG. 19 an alternative embodiment of the invention is shown in which upper and lower canard surfaces 140 and control surfaces 142 are blown from ducts 144 that pass a propulsive stream from main engines 146 by way of channels 148. Mounted above and below canard control surfaces 140, to a tailpipe section of each duct are vertical rudders 149. Rudders 149 are like the vertical rudders 46 shown in FIG. 15 and are used to provide yaw control of aircraft 100. The technique of incorporating ducts from the aircraft's main engines to the forward canard surfaces, though shown as utilized with the embodiment of the invention illustrated in FIGS. 16 through 18, is applicable to all embodiments of the invention.

Figure 20:
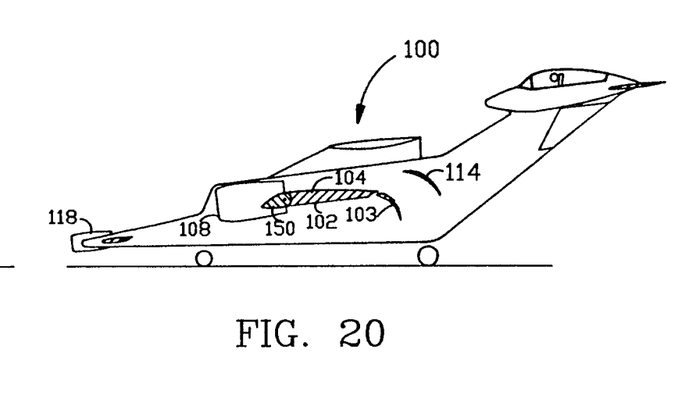
FIGS. 20–22 are sectional views of the aircraft of FIG. 16 showing takeoff/landing sequences of the aircraft.
Figure 21:
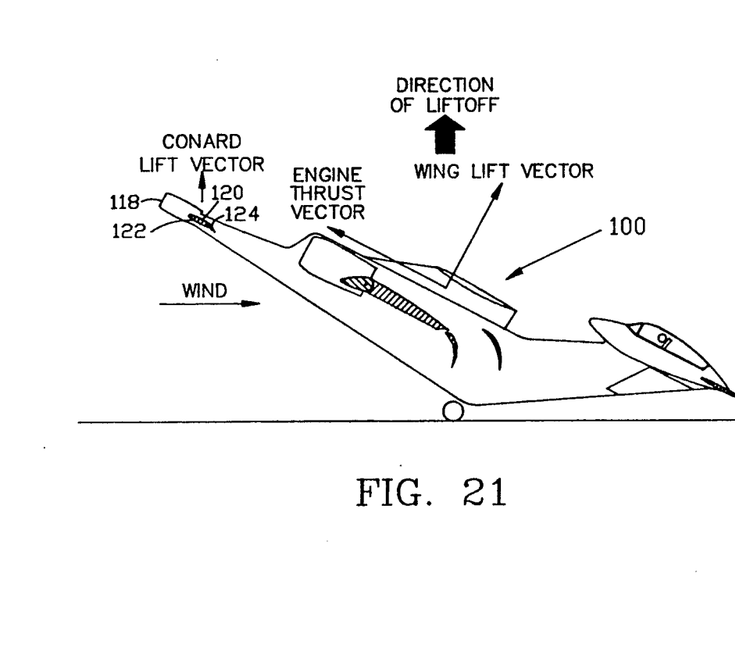
Figure 22:
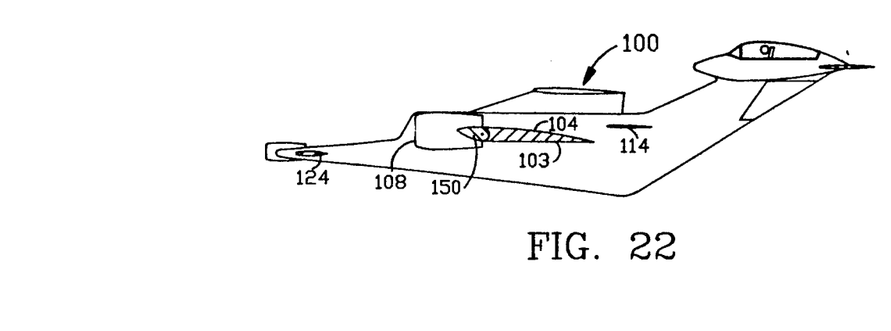

In FIGS. 20-22, sectional views show a takeoff sequence of the aircraft illustrated in FIG. 16. Landing is done in essentially a reverse order of this sequence.

Taxiing for takeoff includes full extension of trailing edge flap 103 and augmenter surface 114. Control blade 150, individual to engines 108, is pivotally attached to the leading edge of wing 102 and is tilted downwardly so as to direct a majority of the propulsive streams from engines 108 over upper surface 104 of the wing. Referring now primarily to FIG. 21 with reference to FIGS. 16-18, aircraft 100 is aimed into any wind, if present, prior to takeoff. Canard engines 118 are then used to blow both upper and lower canard surfaces 120 and 122, respectively, as well as to blow downwardly tilting control surfaces 124, to raise the nose of the aircraft. Power to main engines 18 is then increased until the wing lift vector and engine thrust vector result in a lifting of the plane vertically.

FIG. 22 shows a cruising orientation of the control surfaces of aircraft 100. In this mode canard control flaps 124, main airfoil flaps 103 and augmenter surfaces 114 are fully retracted. Control blade 150 is tilted slightly upwardly to decrease the flow of the propulsive stream flowing over upper surface 104 to decrease lift of the aircraft.

Figure 23:
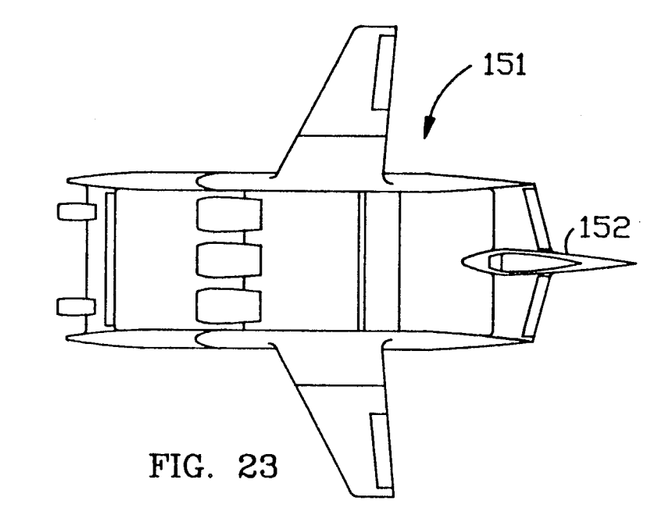
FIGS. 23–25 illustrates a single flight station version of the invention in top, front and side views, respectively.
Figure 24:
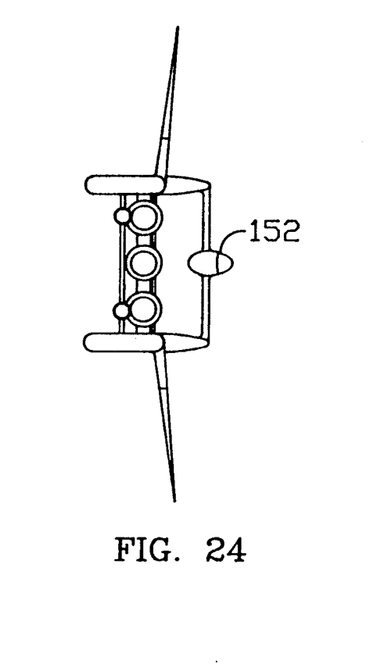
Figure 25:
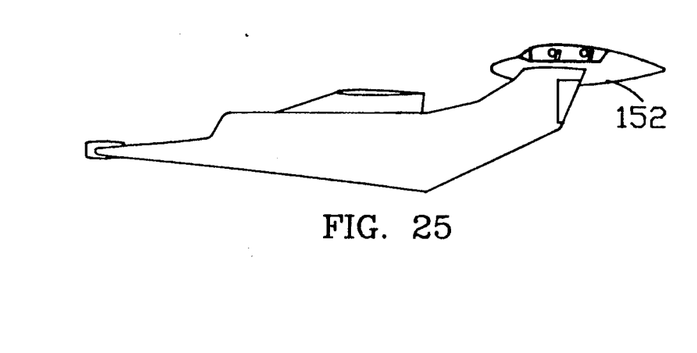

In FIGS. 23 through 25 an alternative embodiment of the aircraft shown in FIG. 16 is illustrated. Aircraft 151 includes a single flight station 152.

Figure 26:
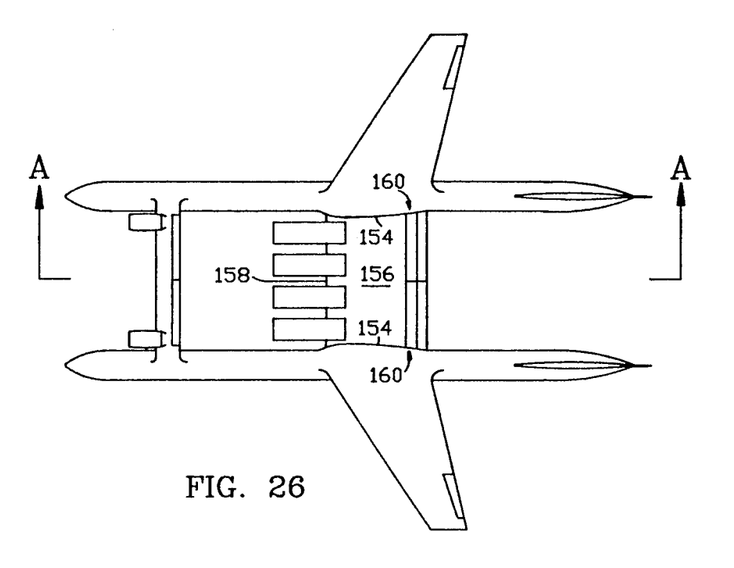
FIGS. 26–28 illustrates an aircraft like that shown in FIG. 1 in which the fuselages of the aircraft each have an inwardly bulbous area above a top surface of a main airfoil.
Figure 27:
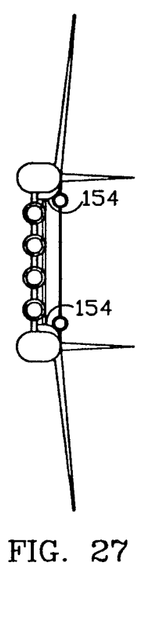
Figure 28:
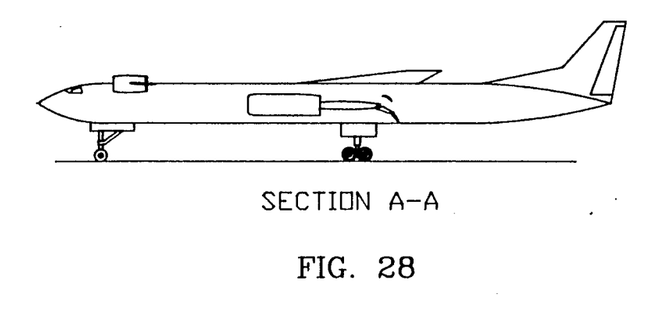

Referring to FIGS. 26 through 28 and FIGS. 29 through 31, alternative embodiments of the aircraft shown in FIGS. 1 and 12 are shown, respectively. In these embodiments an enhanced venturi effect is intended. In FIGS. 26 and 27 it can be seen that walls 154 are inwardly bulbous over a top surface 156 of main airfoil 158. Proximate to the trailing edge of main airfoil 158, at an area designated as 160, the restraining walls 154 diverge from each other according to the well established "coke-bottling" technique.

Figure 29:
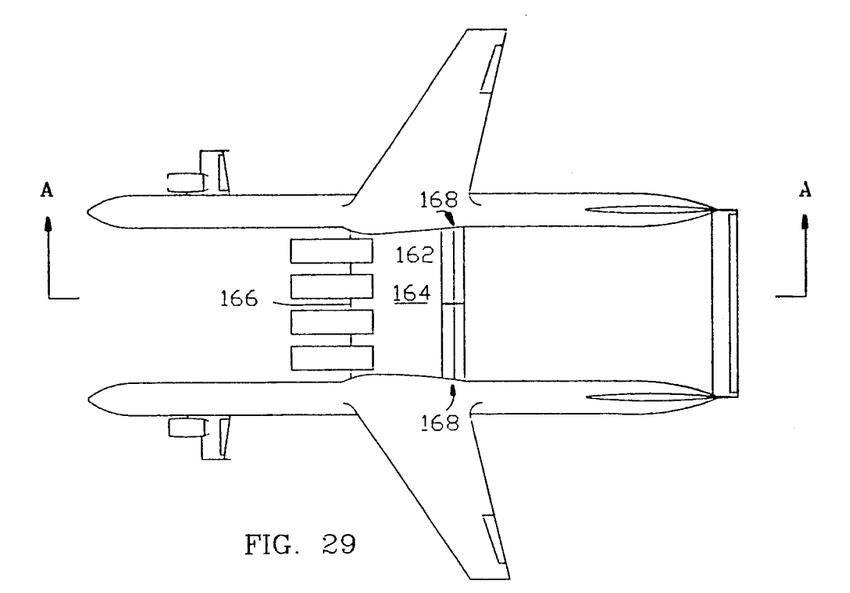
FIGS. 29–31 illustrates an embodiment of the invention like that shown in FIG. 12 incorporating fuselages having inwardly bulbous areas.
Figure 30:
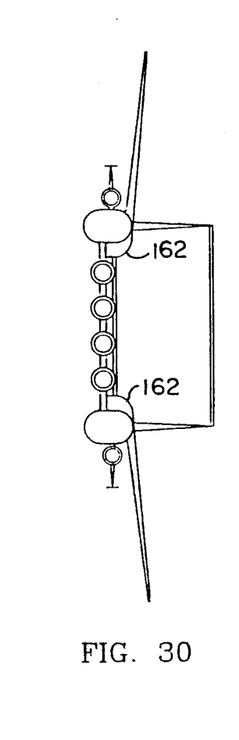
Figure 31:
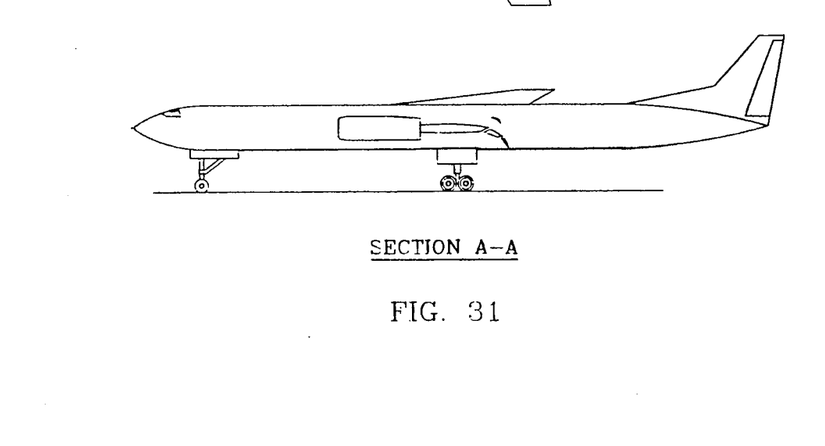

In FIGS. 29 through 31 an embodiment of the aircraft shown in FIG. 12 is illustrated in which inwardly bulbous walls 162 are disposed above top surface 164 of main airfoil 166. Walls 162 diverge at an area 168 proximate to the trailing edge of airfoil 166.

The inwardly bulbous and diverging walls shown in FIGS. 26–31 are not limited to the particular embodiments of the invention shown but may be utilized with any of the embodiments of the invention.

Though the numerous embodiments of the invention have been disclosed as incorporating dual fuselages, one skilled in the art will realize that single fuselage embodiments of the invention are possible. In single fuselage schemes, above and below wing blowing could be controlled by restraining walls integral with the fuselage or formed independently of the fuselage on the wings of the aircraft or a combination of these.

Further, though jet engines have been disclosed as being usable with the invention, propeller driven engines may also be used where these engines are capable of developing sufficient propulsive discharges.

The various aircraft proposed are designed for high lift so as to make vertical or near vertical takeoff and landings possible. Aircraft of this type can eliminate a number of the factors that contribute to unsafe flight. High speed runs on takeoff and landing will be avoided with such an aircraft. Cross winds will not pose a problem to the aircraft as crabbing into the wind will be unnecessary. Wing icing will be substantially reduced as the hot exhaust gases of the aircraft's engines will be expelled over a majority of the aircraft's wing surfaces. "Hard" landings such as those of one and one-half g's or greater will also be eliminated by the vertical takeoff and landing attributes of the proposed craft.

The numerous and varied embodiments of the invention have been disclosed in order to enable one to understand the makings and workings of the invention. These embodiments should not however be considered the only possible embodiments of the invention or even several of a few possible embodiments of the invention as those skilled in the art will realize that many variations and modifications of the invention are possible in light of the above teachings. It is therefore to be understood that within the scope of the appended claims the invention may be practiced otherwise than as has been described.

What is claimed is:

1. An aircraft comprising:
a fuselage;
an airfoil attached to said fuselage having an extendable and retractable trailing edge wing flap;
propulsion means for expelling a propulsive stream over both a top and a bottom surface of said airfoil;
a horizontal control blade pivotally attached to a leading edge of said airfoil to proportion the flow of said propulsive stream above and below said airfoil;
an augmenter wing attached to said fuselage and disposed aft and above said airfoil for capturing and redirecting said propulsive stream expelled over said top surface of said airfoil, said augmenter wing having an extendable and retractable trailing edge flap;
two restraining walls each extending above and below said airfoil and being attached to said airfoil in general alignment with the chord of said airfoil, said restraining walls being disposed opposite each other so that said propulsive stream flows between said restraining walls; and
a tail section attached to said fuselage aft of said airfoil.

2. An aircraft comprising:
a pair of fuselages;
an airfoil attached between said pair of fuselages;
propulsion means for expelling a propulsive stream over both a top and a bottom surface of said airfoil;
two restraining walls, one of said restraining walls being a part of one of said fuselages of said pair of fuselages, said restraining walls each extending above and below said airfoil and being attached to said airfoil in general alignment with the chord of said airfoil, said restraining walls being disposed opposite each other so that said propulsive stream flows between said restraining walls; and
a tail section attached aft of said airfoil to said one of said fuselages of said pair of said fuselages with a corresponding second tail section attached aft of said airfoil to a second of said fuselages of said pair of fuselages, said tail sections sharing a common horizontal stabilizer.

3. An aircraft comprising:
a pair of fuselages;
an airfoil attached between said pair of fuselages, said airfoil including an extendable and retractable trailing edge wing flap;
propulsion means for expelling a propulsive stream over both a top and a bottom surface of said airfoil;
an augmenter wing attached between said pair of fuselages and disposed aft and above said airfoil for capturing and redirecting said propulsive stream expelled over said top surface of said airfoil, said augmenter wing having an extendable and retractable trailing edge flap;
two restraining walls, one of said restraining walls being a part of one of said fuselages of said pair of fuselages and a second of said restraining walls being a part of a second of said fuselages of said pair of fuselages, said restraining walls each extending above and below said airfoil and being attached to said airfoil in general alignment with the chord of said airfoil, said restraining walls being disposed opposite each other so that said propulsive stream flows between said restraining walls; and
a tail section attached aft of said airfoil to said one of said fuselages of said pair of fuselages with a corresponding second tail section attached aft of said airfoil to a second of said fuselages of said pair of fuselages.

4. An aircraft according to claim 3 in which said tails sections share a common horizontal stabilizer.

5. An aircraft according to claim 3 or 4 in which a canard is attached to said one of said fuselages forward of said airfoil with a second corresponding canard being attached to said second of said fuselages forward of said airfoil.

6. An aircraft according to claim 5 further including means for expelling a forward propulsive stream over both a top and bottom surface of said canards.

7. An aircraft according to claim 6 in which said canards have a controllable elevator.

8. An aircraft according to claim 3 or 4 in which a single canard is attached between said pair of fuselages.

9. An aircraft according to claim 8 further including means for expelling a forward propulsive stream over both a top and bottom surface of said single canard.

10. An aircraft comprising:
two fuselages;
an airfoil attached between said two fuselages;
propulsion means for expelling a propulsive stream over both a top and bottom surface of said airfoil;
two restraining walls each corresponding to one of said two fuselages with each of said restraining walls extending above and below said airfoil and being attached to said airfoil in general alignment with the chord of said airfoil, said restraining walls being disposed opposite each other so that said propulsive stream flows between said restraining walls;
forward wing means attached between said fuselages forward of said airfoil;
means for expelling a forward propulsive stream over both a top and bottom surface of said forward wing means; and
a tail section attached to one of said two fuselages aft of said airfoil with a second tail section attached to a second of said two fuselages aft of said airfoil.

11. An aircraft according to claim 10 in which said airfoil includes an extendable and retractable trailing edge wing flap.

12. An aircraft according to claim 11 further including an augmenter wing attached between said fuselages and disposed aft and above said airfoil for capturing and redirecting said propulsive stream expelled over said top surface of said airfoil, said augmenter wing having an extendable and retractable trailing edge flap.

13. An aircraft according to claim 12 further comprising:
a horizontal control blade pivotally attached to the leading edge of said airfoil to proportion the flow of said propulsive stream above and below said airfoil.

14. An aircraft according to claim 13 in which said forward wing means includes a canard attached between said fuselages.

15. An aircraft according to claim 14 in which said canard includes a controllable elevator.

16. An aircraft according to claim 15 in which said restraining walls become bulbous at an area above said top surface of said airfoil and are divergent from each other at an area of attachment to said airfoil proximate to the trailing edge of said airfoil.

17. An aircraft according to claim 16 in which said tail sections share a common horizontal stabilizer.

18. An aircraft comprising:
first and second fuselages;
an airfoil attached between said fuselages so that a wall of each fuselage extends above and below said airfoil, said airfoil including an extendable and retractable slotted trailing edge wing flap;
a pair of outer wings, one mounted on an outboard side of each fuselage; propulsion means for expelling a propulsive stream over both a top and bottom surface of said airfoil;
forward wing means attached to said fuselages forward of said airfoil;
means for expelling a forward propulsive stream over both a top and bottom surface of said forward wing means; and
rear stabilizer means attached to said fuselages aft of said airfoil.

19. An aircraft according to claim 18 further comprising:
a horizontal control blade pivotally attached to the leading edge of said airfoil to proportion the flow of said propulsive stream above and below said airfoil.

20. An aircraft according to claim 19 further including an augmenter wing attached between said fuselages and disposed aft and above said airfoil, said augmenter wing having an extendable and retractable trailing edge flap.

21. An aircraft according to claim 20 in which said propulsion means includes a jet engine mounted to the leading edge of said airfoil and in which said means for expelling a forward propulsive stream includes a jet engine mounted to a leading edge of said forward wing means.

22. An aircraft according to claim 21 in which said jet engine of said means for expelling a forward propulsion stream includes an exhaust tailpipe through which said forward propulsive stream is passed, said exhaust tailpipe having opposing vertical rudders pivotally attached to an aft end of said tailpipe.

23. An aircraft according to claim 22 in which said forward wing means includes a canard attached between said fuselages.

24. An aircraft according to claim 23 in which said canard includes a controllable elevator.

25. An aircraft according to claim 22 in which said forward wing means includes a pair of canards, one mounted on said outboard side of each fuselage.

26. An aircraft according to claim 25 in which said canard includes a controllable elevator.

27. An aircraft according to claim 23, 24, 25 or 26 in which said rear stabilizer means includes a horizontal stabilizer attached said between said fuselages.

* * * * *